United States Patent
Nishimaki et al.

(10) Patent No.: US 8,025,994 B2
(45) Date of Patent: Sep. 27, 2011

(54) ELECTRONIC APPLIANCE

(75) Inventors: Yukinori Nishimaki, Kanagawa (JP); Yuji Sasaki, Tokyo (JP); Kazuyasu Tsunezumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 800 days.

(21) Appl. No.: 12/123,102

(22) Filed: May 19, 2008

(65) Prior Publication Data

US 2008/0311467 A1    Dec. 18, 2008

(30) Foreign Application Priority Data

Jun. 15, 2007   (JP) .................. 2007-158381

(51) Int. Cl.
*H01M 2/10* (2006.01)

(52) U.S. Cl. ............... 429/96; 429/97; 429/99; 429/100

(58) Field of Classification Search ............ 429/96, 429/97, 99, 100, 149, 150, 151; 206/703; 224/902; 439/504; 361/679.01
See application file for complete search history.

(56) References Cited

U.S. PATENT DOCUMENTS

| | | | |
|---|---|---|---|
| 2006/0210869 A1* | 9/2006 | Takeguchi et al. | 429/153 |
| 2007/0090700 A1* | 4/2007 | Matthias et al. | 310/50 |
| 2008/0020274 A1* | 1/2008 | Takeshita et al. | 429/179 |

FOREIGN PATENT DOCUMENTS

| | | |
|---|---|---|
| JP | 9-259850 | 10/1997 |
| JP | 2005-198499 | 7/2005 |

* cited by examiner

*Primary Examiner* — Raymond Alejandro
(74) *Attorney, Agent, or Firm* — Oblon, Spivak, McClelland, Maier & Neustadt, L.L.P.

(57) ABSTRACT

An electronic appliance includes a battery mounting portion on which two types of batteries are selectively mounted, wherein the battery mounting portion has: a battery mounting recessed portion; an appliance side connecting terminal; an urging member; and a single manipulating member; while a battery side connecting terminal of one battery is being attached to one appliance side connecting terminal, one engaging member is engaged with the one battery to prevent the one battery from moving in a direction of detaching the battery side connecting terminal from the one appliance side connecting terminal; and while a battery side connecting terminal of the other battery is being attached to the other appliance side connecting terminal, the other engaging member is engaged with the other battery to prevent the other battery from moving in a direction of detaching the battery side connecting terminal from the other appliance side connecting terminal.

11 Claims, 17 Drawing Sheets

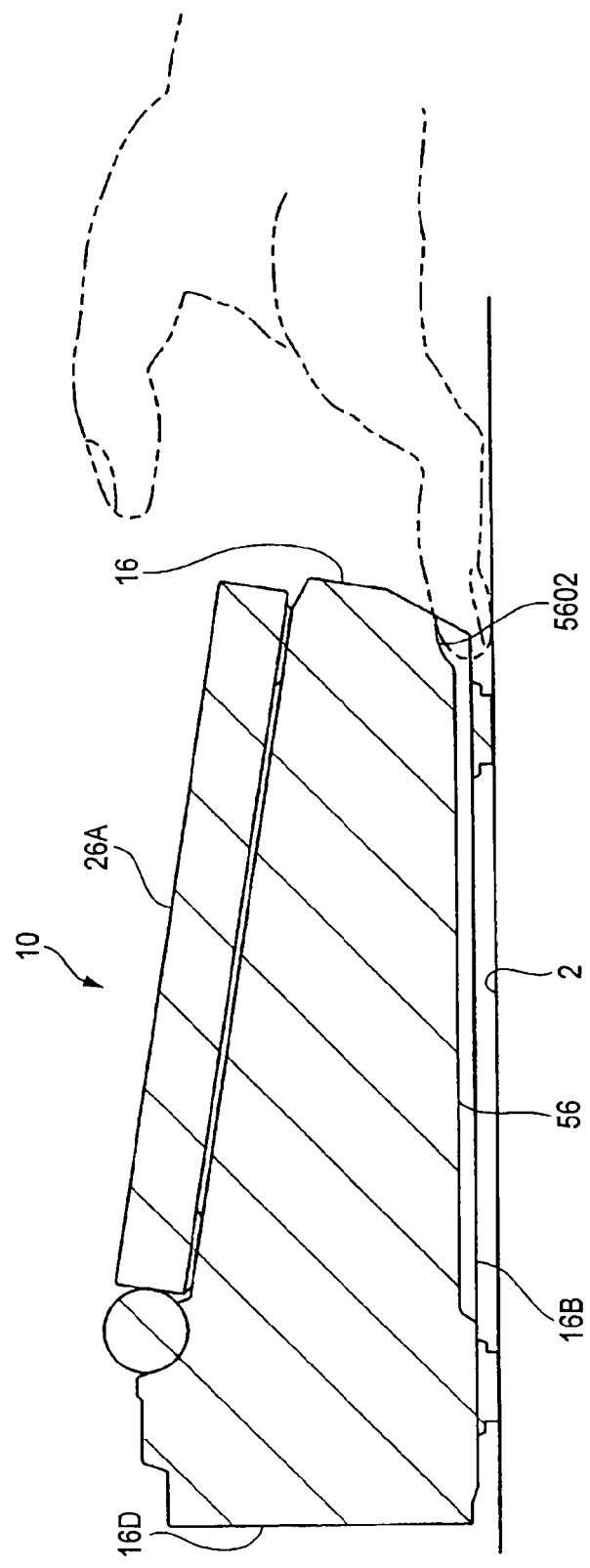

ELECTRONIC APPLIANCE

CROSS REFERENCES TO RELATED APPLICATIONS

The present invention contains subject matter related to Japanese Patent Application JP 2007-158381 filed in the Japanese Patent Office on Jun. 15, 2007, the entire contents of which being incorporated herein by reference.

BACKGROUND OF THE INVENTION

1. Field of the Invention

The present invention relates to an electronic appliance on and from which a battery is mounted and dismounted.

2. Description of the Related Art

Various electronic appliances are provided that have a battery mounting portion on which a battery is detachably mounted (see JP-A-2005-198499 (Patent Reference 1)).

For such an electronic appliance, as shown in FIGS. 17A and 17B, a charging apparatus 90 is provided that can charge both of two types of batteries B1 and B2 having different terminal shapes and exterior dimensions.

This charging apparatus 90 has a battery mounting portion 92 on which two types of batteries B1 and B2 are selectively mounted, in which appliance side connecting terminals 94A and 94B are provided that correspond to two types of battery side connecting terminals on both ends of the battery mounting portion 92 in the width direction.

Then, in the case in which one battery B1 is charged in two types of the batteries B1 and B2, as shown in FIG. 17A, this battery B1 is mounted on the place close to one side of the battery mounting portion 92 in the width direction to connect the battery side connecting terminal to the appliance side connecting terminal 94A corresponding thereto, whereas in the case in which the other battery B2 is charged in two types of batteries, as shown in FIG. 17B, the battery B2 is mounted on the place close to the other side of the battery mounting portion 92 in the width direction to connect the battery side connecting terminal to the other appliance side connecting terminal 94B corresponding thereto.

SUMMARY OF THE INVENTION

In the case in which the battery mounting portion 92 on which these two types of batteries B1 and B2 are selectively mountable is adapted to a portable electronic appliance, even though an impact or vibrations that occur in association with carrying the appliance are applied, the state of the mount of the battery can be reliably maintained. In other words, it is demanded that the state of the connection of the battery side connecting terminal to the appliance side connecting terminal can be reliably maintained as well as the battery is easily mounted and dismounted.

Thus, it is desirable to provide an electronic appliance that allows a battery to be reliably mounted thereon and advantageously intends an improved operability.

An embodiment of the invention is directed to an electronic appliance including: a battery mounting portion on which two types of batteries are selectively mounted, wherein the battery mounting portion has: a battery mounting recessed portion; an appliance side connecting terminal that is provided at different places in the battery mounting recessed portion and attached to or detached from a battery side connecting terminal of the battery; two engaging members that are provided at places different from the individual appliance side connecting terminals in the battery mounting recessed portion and separately come in and go out of the battery mounting recessed portion; an urging member that individually urges the two engaging members in a direction to protrude into the battery mounting recessed portion; and a single manipulating member that retracts the two engaging members from the inside of the battery mounting recessed portion to the outside of the battery mounting recessed portion, in a state in which the battery side connecting terminal of one battery of two types of the batteries is attached to one of the two appliance side connecting terminals, one engaging member of the two engaging members is engaged with the one battery to prevent the one battery from moving in a direction in which the battery side connecting terminal is detached from the one appliance side connecting terminal, and in a state in which the battery side connecting terminal of the other battery of two types of the batteries is attached to the other of the two appliance side connecting terminals, the other engaging member of the two engaging members is engaged with the other battery to prevent the other battery from moving in a direction in which the battery side connecting terminal is detached from the other appliance side connecting terminal.

According to the embodiment of the invention, the two engaging members provided in such a way that they can separately come in and go out of the battery mounting recessed portion of the battery mounting portion are used to reliably attach two types of batteries to the battery mounting portion. Thus, it is advantageously intended to improve the stability in the state of the mount of the battery in carrying the electronic appliance. In addition, a single manipulating member is used to release the engagement of the individual engaging members with the battery, whereby the battery is allowed to be easily dismounted from the battery mounting portion, which advantageously intend to improve the operability.

BRIEF DESCRIPTION OF THE DRAWINGS

FIG. 14 shows a vertical cross section depicting a cabinet 16 of the electronic appliance 10;

DESCRIPTION OF PREFERRED EMBODIMENTS

First Embodiment

Next, embodiments of the invention will be described with reference to the drawings.

Figure 1:
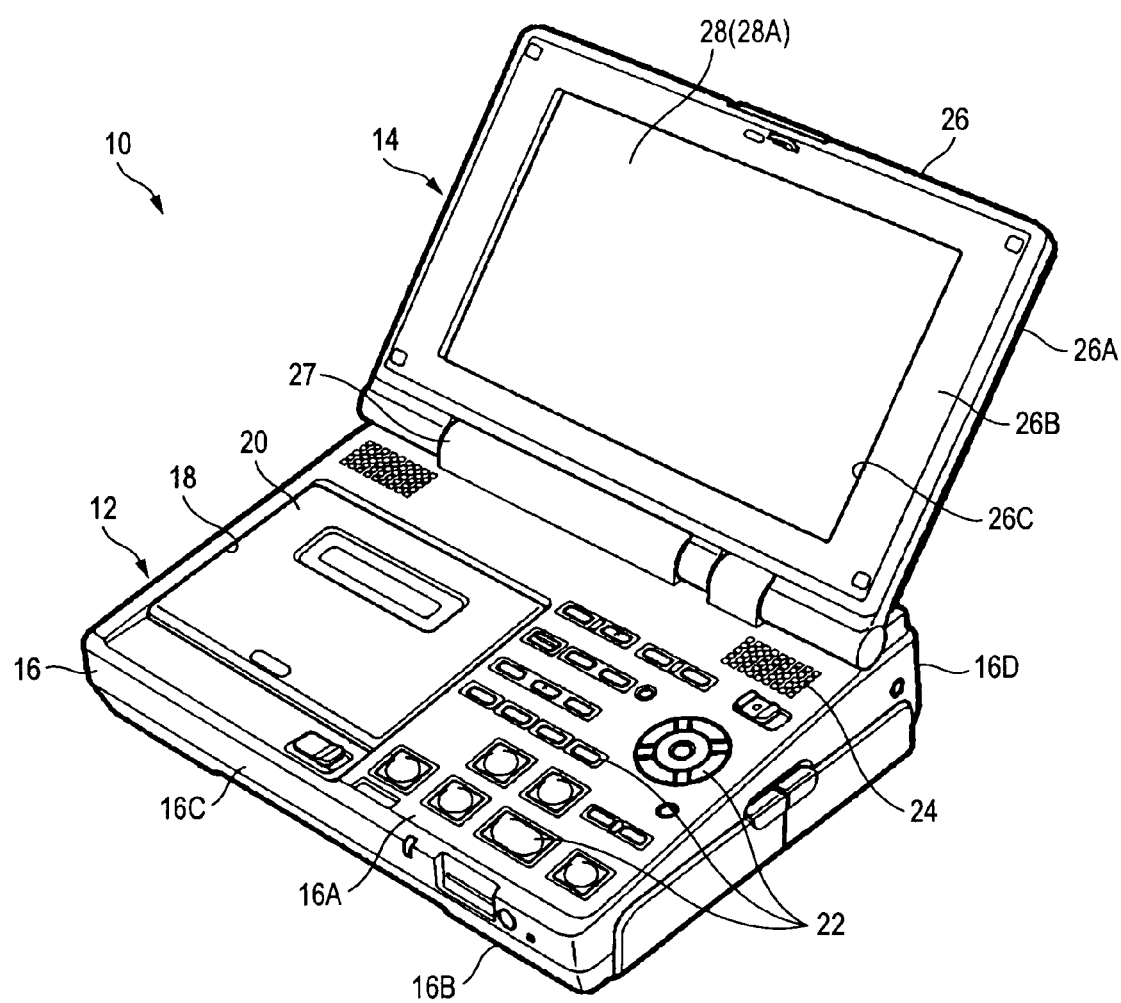
FIG. 1 shows a perspective view depicting an electronic appliance 10 according to an embodiment with a display panel thereof opened.
Figure 2:
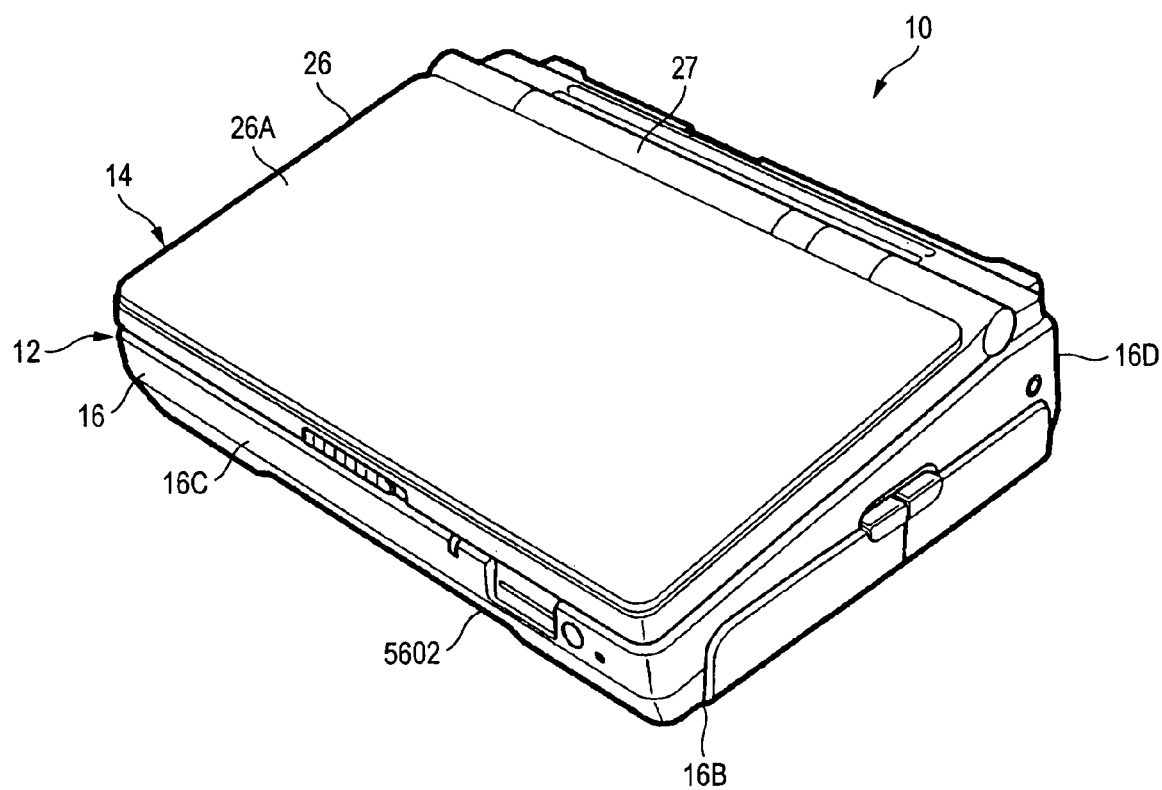
FIG. 2 shows a perspective view depicting the electronic appliance 10 with the display panel closed.
Figure 3:
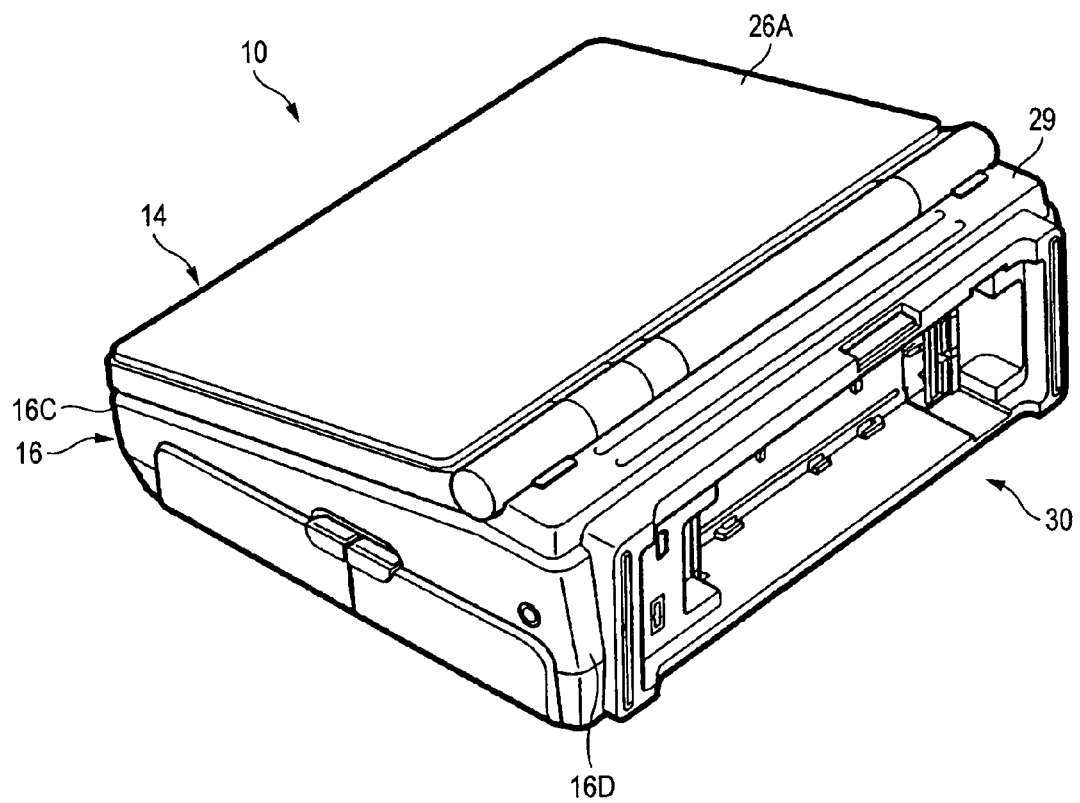
FIG. 3 shows a perspective view depicting a battery mounting portion 30 of the electronic appliance 10.

FIG. 1 shows a perspective view depicting an electronic appliance 10 according to an embodiment with a display panel thereof opened, FIG. 2 shows a perspective view depicting the electronic appliance 10 with the display panel closed, and FIG. 3 shows a perspective view depicting a battery mounting portion 30 of the electronic appliance 10.

In the embodiment, the electronic appliance 10 is a portable video tape recorder that reproduces video recorded on a video cassette tape, or edits video, or records video on a video cassette tape.

The electronic appliance 10 has a main body portion 12, and a display panel 14 that is coupled to the main body portion 12.

The main body portion 12 has a cabinet 16 in a nearly rectangular plate shape that configures the exterior.

The cabinet 16 has a top surface 16A facing upward, a bottom surface 16B facing downward, right and left side surfaces facing rightward and leftward, a front surface 16C facing forward, and a rear surface 16D facing backward, and a battery mounting portion 30 according to an embodiment of the invention is provided on the rear surface 16D.

Figure 7:
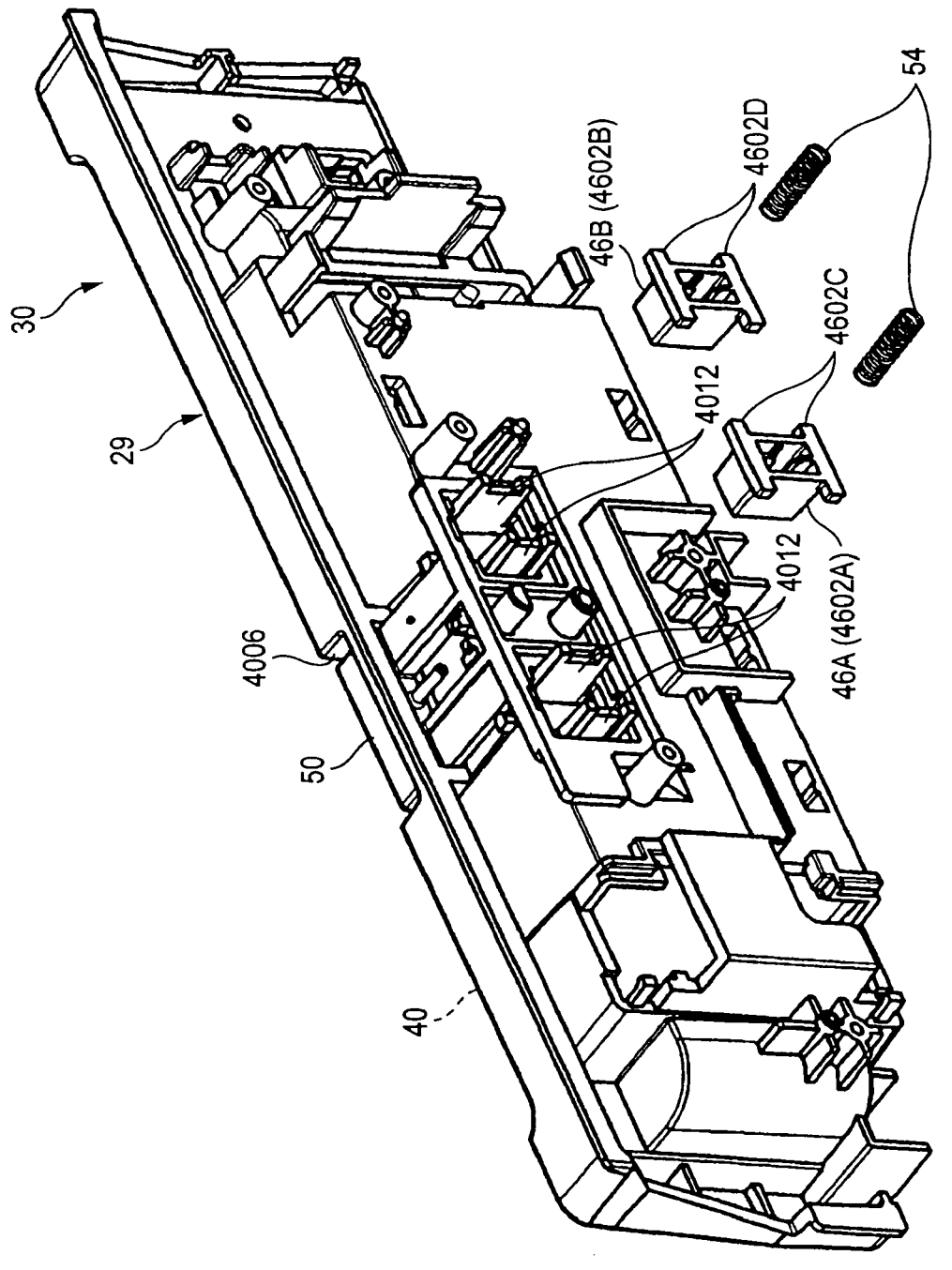
FIG. 7 shows an exploded perspective view depicting the battery mounting portion 30.

In the embodiment, as shown in FIG. 3, a battery mounting case 29 shown in FIG. 7 is mounted on the rear portion of the cabinet 16, and the rear surface 16D of the cabinet 16 is configured of the battery mounting case 29.

On the left half of the top surface 16A, a mounting/dismounting port 18 is provided for mounting and dismounting a video cassette tape, on which a cover 20 is provided for opening and closing the mounting/dismounting port 18.

Inside the mounting/dismounting port 18, a recording/reproducing mechanism, not shown, is provided that records and/or reproduces data on a video cassette tape.

On the right half of the top surface 16A, a plurality of manipulating buttons 22 is provided including a play button, a stop button, a pause button, a fast forward button, a rewind button, and a volume adjusting button that are manipulated in reproducing and editing a video cassette, or setting buttons for various settings.

In addition, on the right and left sides near the rear portion of the top surface 16A, a speaker 24 that outputs sounds is provided.

The display panel 14 has a panel case 26, and a liquid crystal display 28.

The panel case 26 has a rectangular plate shape in the size that covers almost all of the top surface 16A of the cabinet 16, and the rear portion of the panel case 26 is swingably joined to the rear portion of the cabinet 16 through a hinge 27, whereby the panel case 26 is opened and closed between the used position at which the panel case 26 is opened with respect to the top surface 16A as shown in FIG. 1 and the accommodated position at which the panel case 26 is overlaid with the top surface 16A as shown in FIG. 2.

The panel case 26 has an outer surface 26A facing upward, and an inner surface 26B facing the top surface 16A on the opposite side of the outer surface 26A in the state in which the panel case 26 is positioned at the accommodated position, and a rectangular opening 26C is formed in the inner surface 26B.

The liquid crystal display 28 is assembled in the panel case 26 in such a way that a display surface 28A thereof faces the opening 26C, and reproduced video from a video cassette tape is displayed on the display surface 28A of the liquid crystal display 28 by the recording/reproducing mechanism.

Next, the battery mounting portion 30 will be described.

First, the battery mounted on the battery mounting portion 30 will be described.

Figure 4:
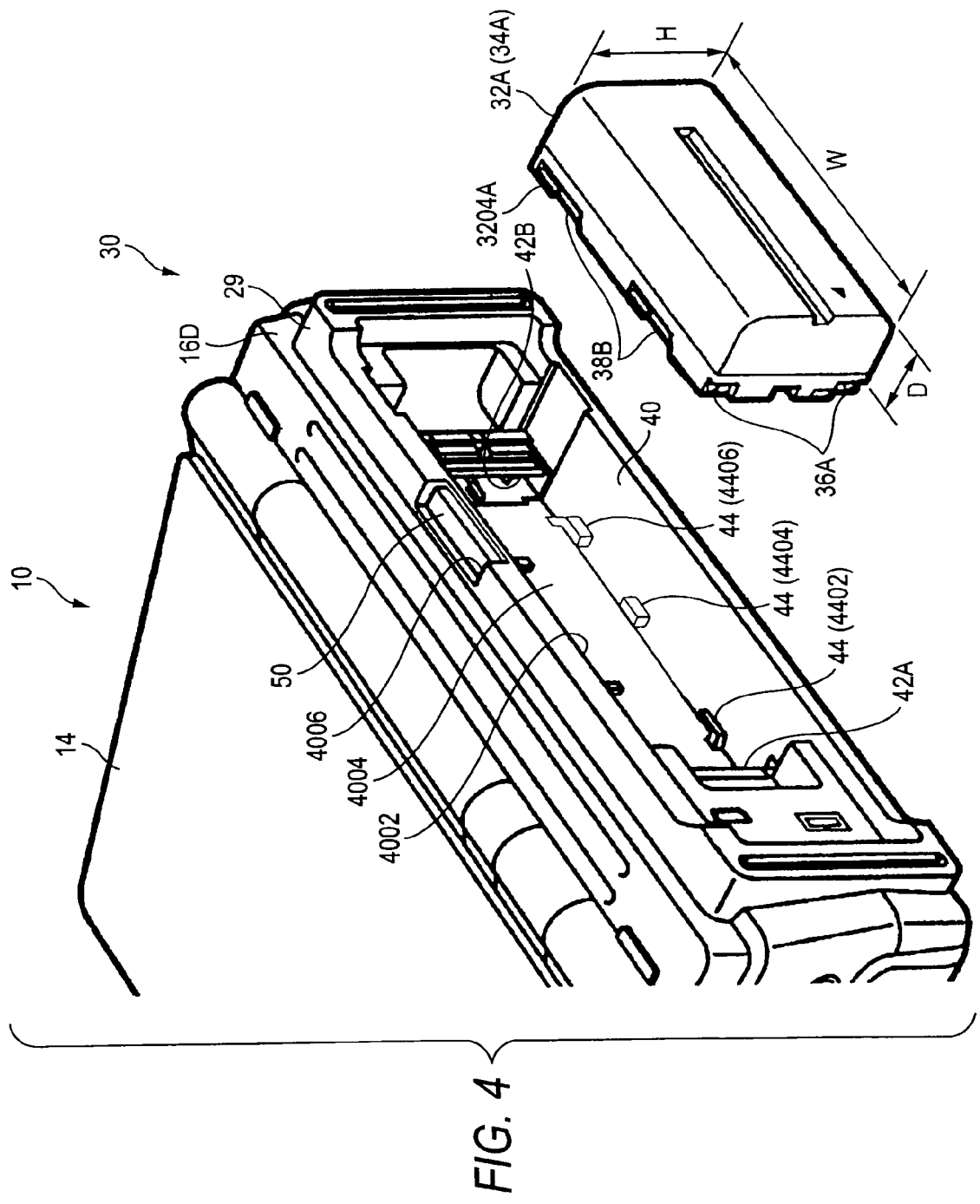
FIG. 4 shows a perspective view depicting the battery mounting portion 30 and a first battery 32A.
Figure 5:
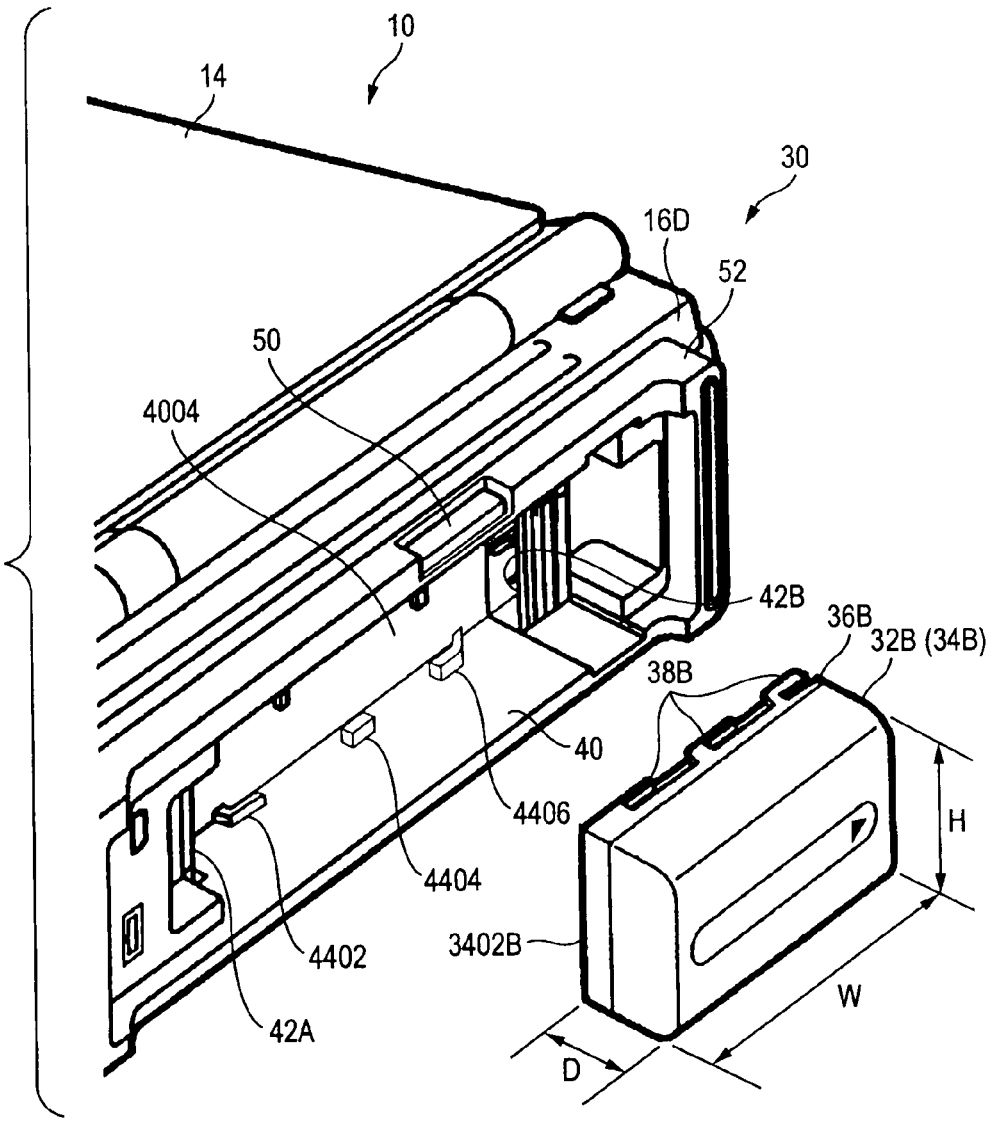
FIG. 5 shows a perspective view depicting the battery mounting portion 30 and a second battery 32B.

FIG. 4 shows a perspective view depicting the battery mounting portion 30 and a first battery 32A, and FIG. 5 shows a perspective view depicting the battery mounting portion 30 and a second battery 32B.

In the embodiment, the battery mounting portion 30 is configured on which two types of batteries are mountable.

Hereinafter, for convenience of explanation, one of two types of batteries is referred to as the first battery 32A, and the other one is referred to as the second battery 32B.

As shown in FIGS. 4 and 5, the first and second batteries 32A and 32B have cases 34A and 34B in which a battery cell and a control board, not shown, are accommodated.

In the embodiment, the case 34A of the first battery 32A and the case 34B of the second battery 32B are formed to have a height H and a depth D in the same dimensions, and a width W of the case 34A of the first battery 32A is formed greater than a width W of the case 34B of the second battery 32B.

One of the end surfaces in the direction of a depth D of the cases 34A and 34B of the first and second batteries 32A and 32B is bottom surfaces 3402A and 3402B.

Then, battery side connecting terminals 36A and 36B connected to the control boards are provided on one end portion in the width direction of the bottom surfaces 3402A and 3402B of the cases 34A and 34B.

The battery cell is charged by supplying charge current thereto through the battery side connecting terminals 36A and 36B and the control board, and the battery cell supplies current to the electronic appliance 10 through the battery side connecting terminals 36A and 36B and the control board.

The control board is connected to the battery cell, having a function to control charging/discharging the battery cell and to communicate data indicating the remaining amount of the battery cell with the electronic appliance 10.

The battery side connecting terminals 36A and 36B have a current supply terminal that supplies charge current to the battery cell and discharge current from the battery cell to the electronic appliance 10, and a data communication terminal that communicates between the control board and the electronic appliance.

In the embodiment, the battery side connecting terminal 36A of the first battery 32A and the battery side connecting terminal 36B of the second battery 32B have the same number of terminals, but have the different terminal shape and the different arranging positions of the terminals.

In detail, three battery side connecting terminals 36A of the first battery 32A are spaced in the direction of the height H, whereas three battery side connecting terminals 36B of the second battery 32B are spaced in the direction of the height H.

In addition, at the midpoint in the direction of the width W of the bottom surface 3402A of the case 34A of the first battery 32A, two guide grooves 38A are spaced in the direction of the width W of the case 34A at the places on both sides in the direction of the height H, and four guide grooves 38A are provided in total.

In addition, at the midpoint in the direction of the width W of the bottom surface 3402B of the case 34B of the second battery 32B, three guide grooves 38B are spaced in the direction of the width W the case 34B at the places on both sides in the direction of the height H, and six guide grooves 38B are provided in total.

Figure 6:
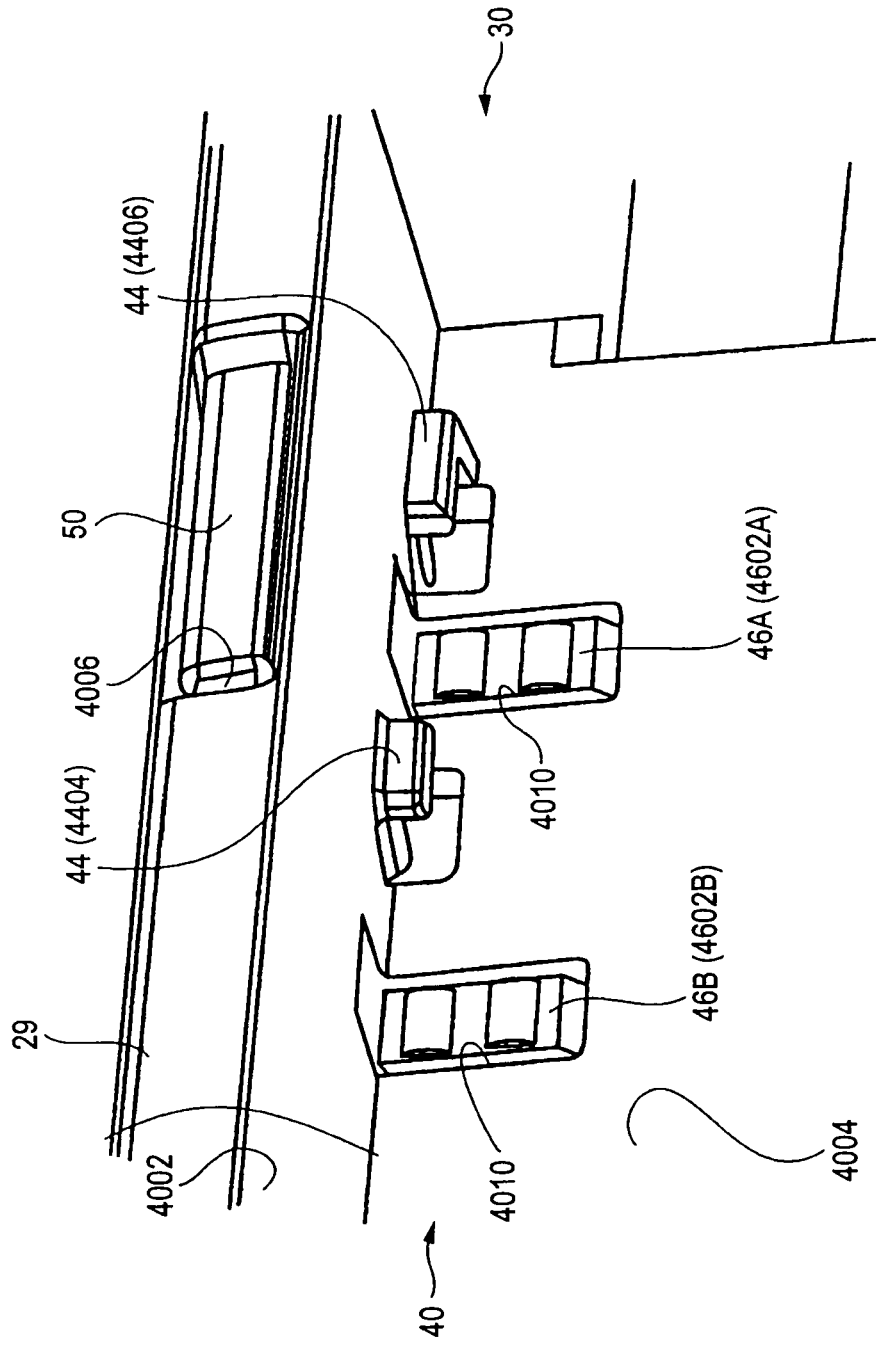
FIG. 6 shows an enlarged perspective view depicting the essential portion of the battery mounting portion 30.
Figure 8:
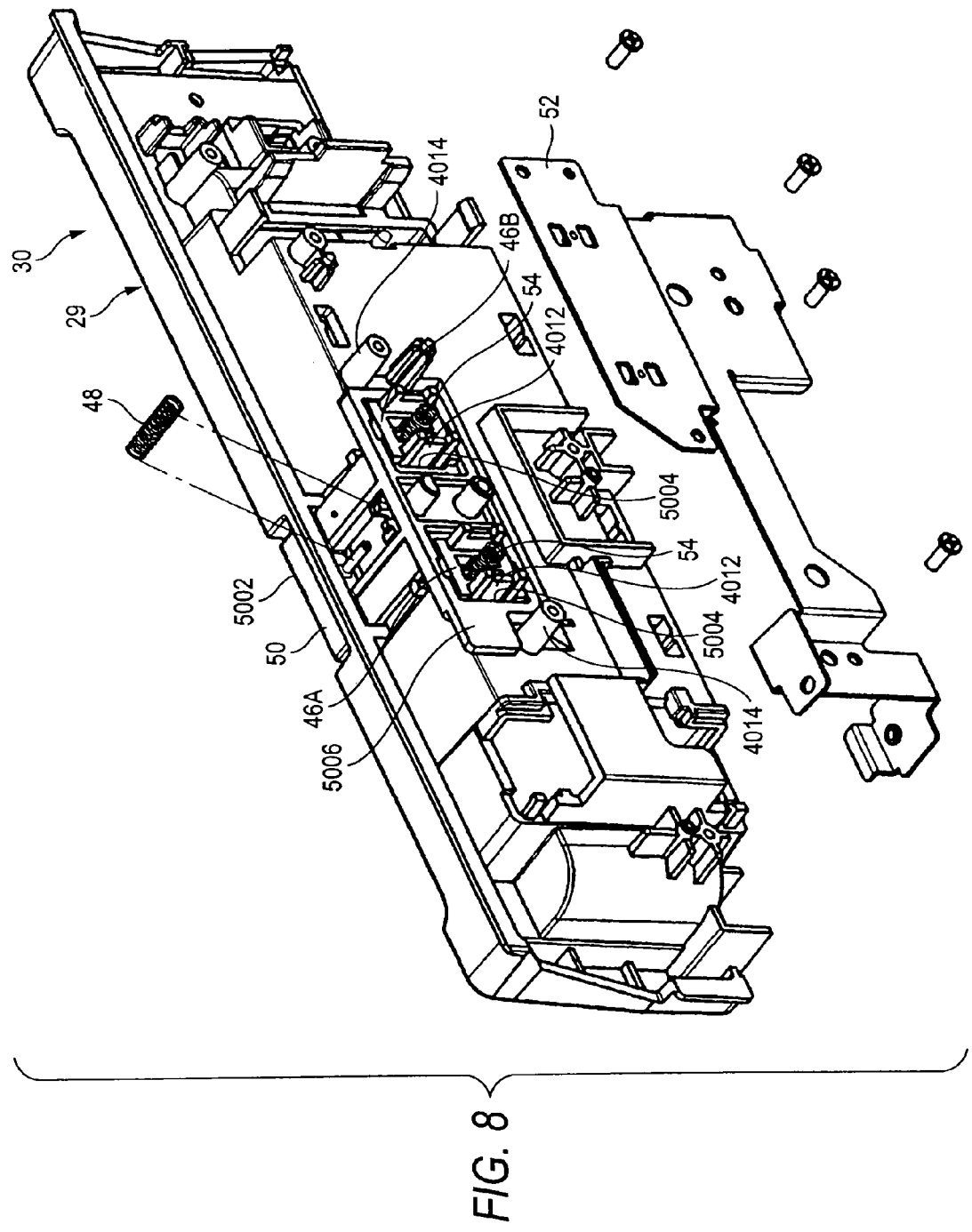
FIG. 8 shows an exploded perspective view depicting the battery mounting portion 30.
Figure 9:
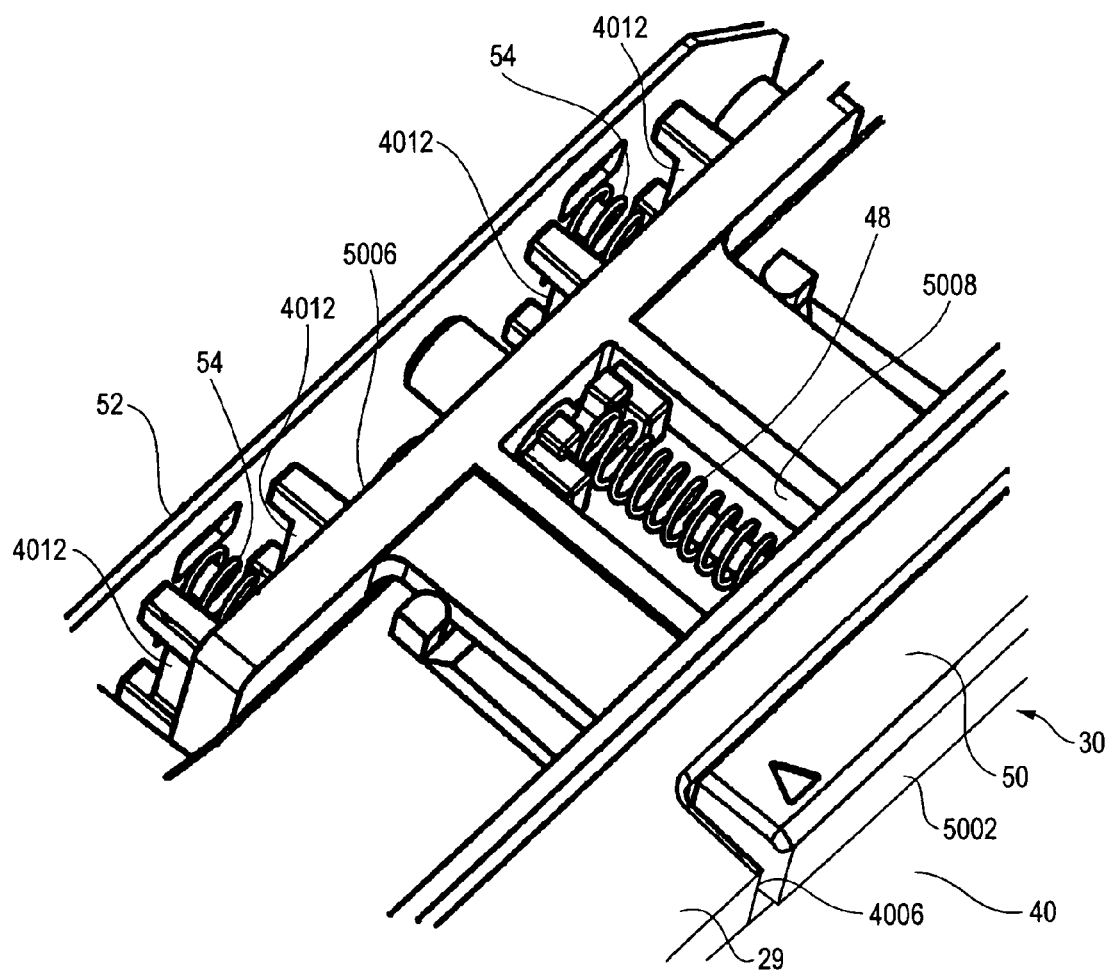
FIG. 9 shows a perspective view depicting the area around a manipulating member 50 and components therearound.
Figure 10:
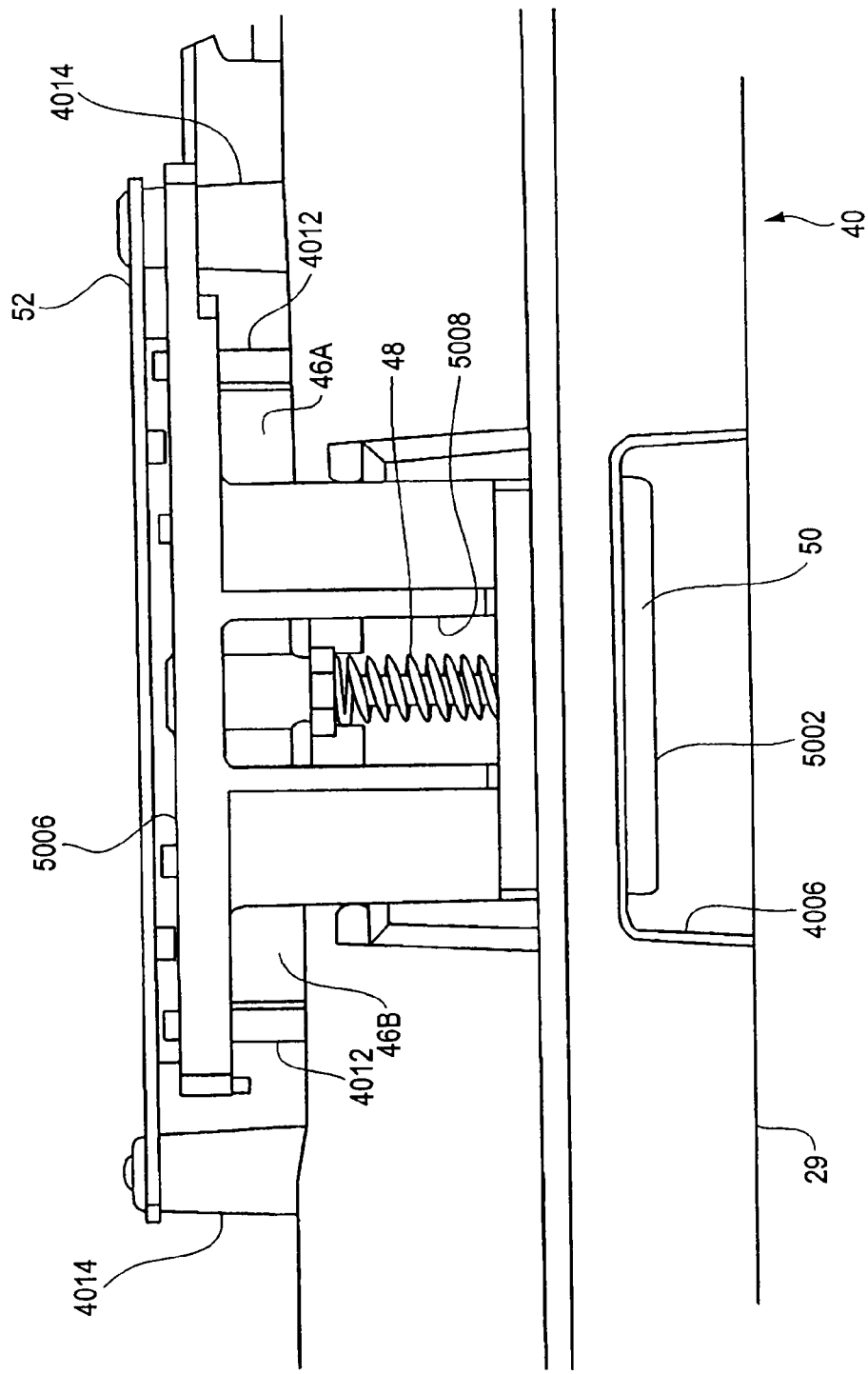
FIG. 10 shows a plan view depicting the manipulating member 50 and components therearound.
Figure 11:
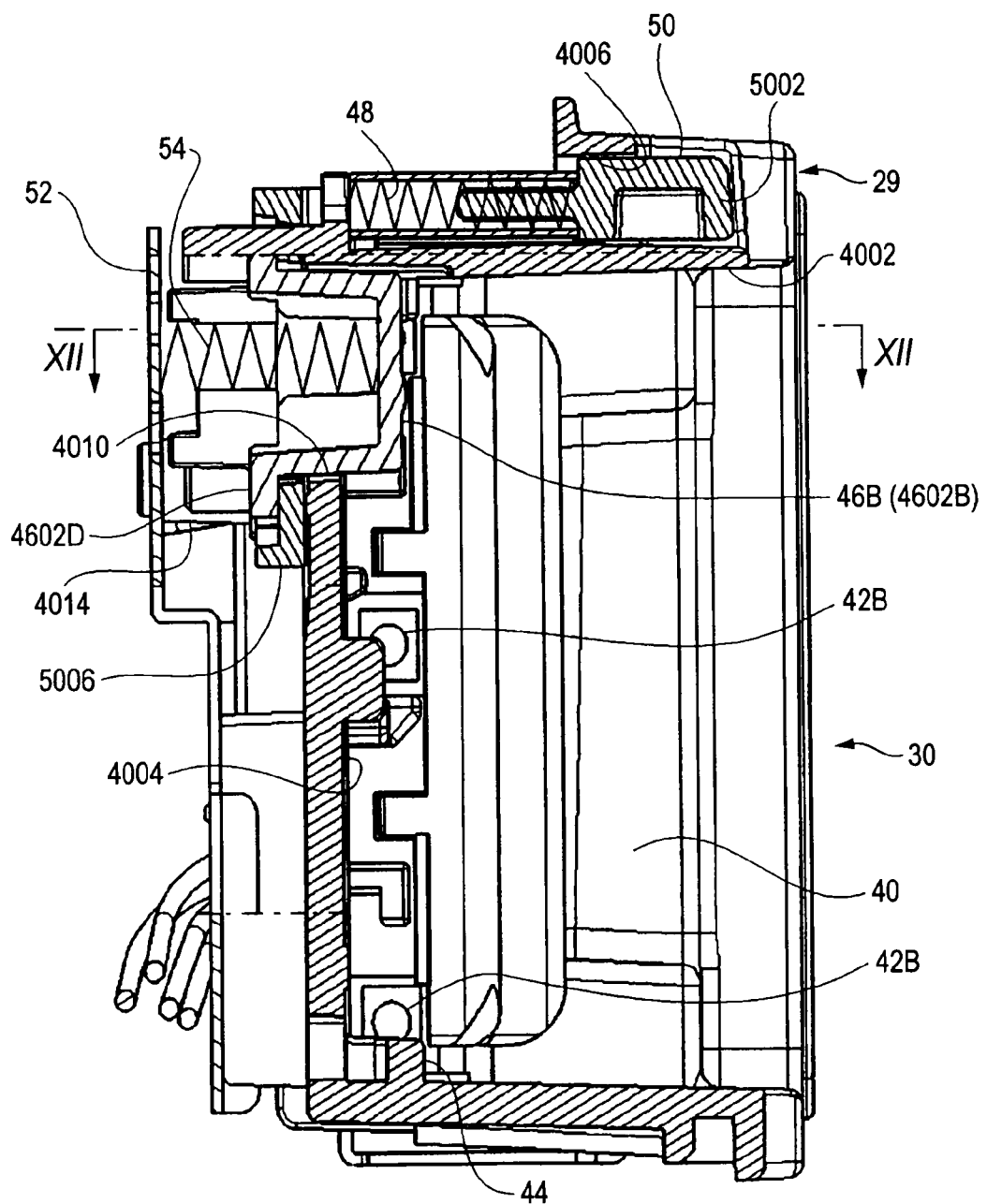
FIG. 11 shows a vertical cross section depicting the battery mounting portion 30.
Figure 12:
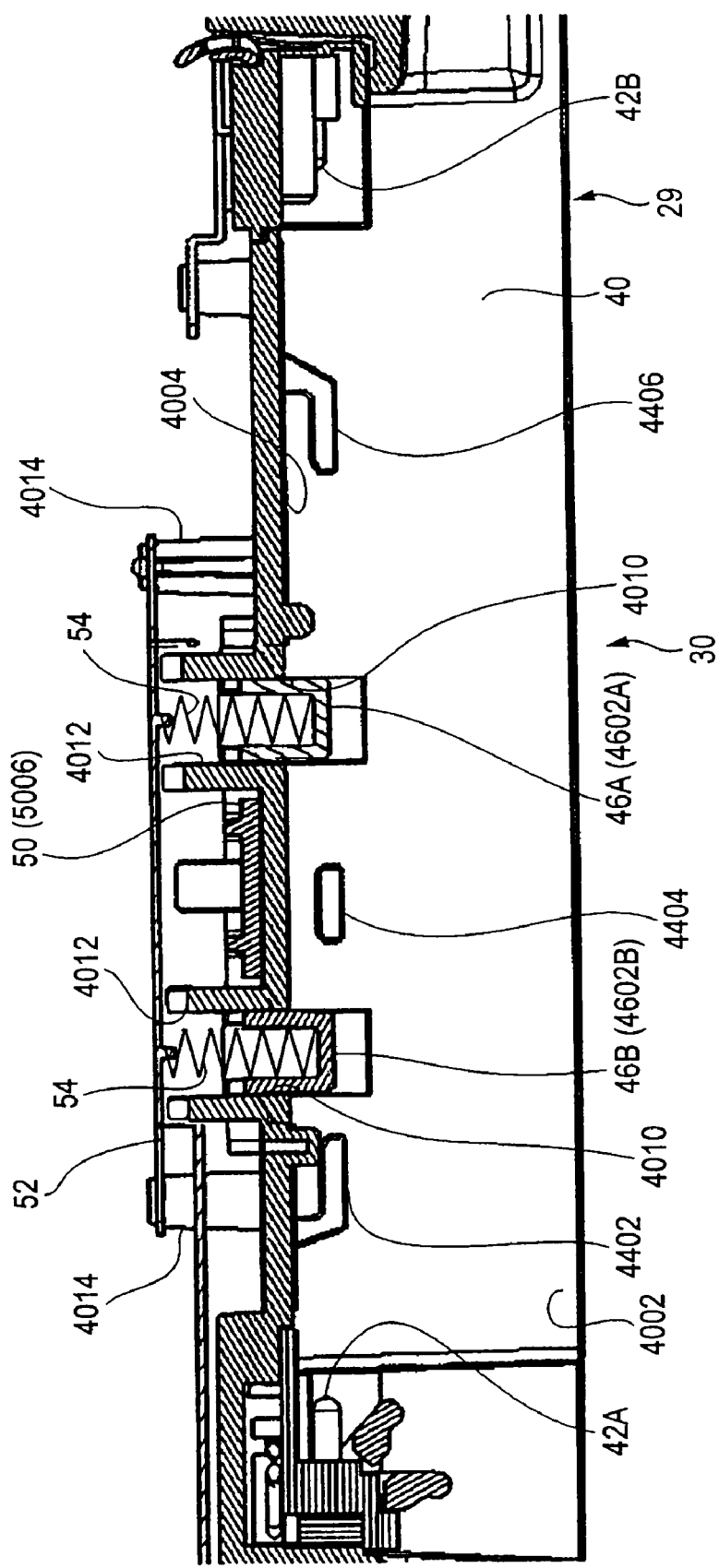
FIG. 12 shows a cross section of line A-A shown in FIG. 11.

FIG. 6 shows an enlarged perspective view depicting the essential portion of the battery mounting portion 30, FIGS. 7 and 8 show an exploded perspective view depicting the battery mounting portion 30, FIG. 9 shows a perspective view depicting the manipulating member 50 and components therearound, FIG. 10 shows a plan view depicting the manipulating member 50 and components therearound, FIG. 11 shows a vertical cross section depicting the battery mounting portion 30, FIG. 12 shows a cross section of line A-A shown in FIG. 11, and FIGS. 13A, 13B and 13C show an illustration depicting the mounting/dismounting operation of the battery.

As shown in FIG. 7, the battery mounting portion 30 is provided on the battery mounting case 29, and as shown in FIGS. 4 and 6, the battery mounting portion 30 is configured to include a battery mounting recessed portion 40, appliance side connecting terminals 42A and 42B, a guide wall 44, engaging members 46A and 46B, a coil spring 48 (FIG. 8), a manipulating member 50, and coil springs 54 (FIG. 8).

The battery mounting recessed portion 40 is provided with the appliance side connecting terminals 42A and 42B, the guide wall 44, a manipulating member hole 4006, and first engaging member holes 4010.

As shown in FIGS. 4 and 5, the battery mounting recessed portion 40 has a height and a depth, and has a width in greater dimensions than the height and the depth.

One end portion in the depth direction of the battery mounting recessed portion 40 is formed as an opening 4002, and a bottom wall 4004 is positioned at the other end portion.

In addition, the surface of the bottom wall 4004 facing the battery mounting recessed portion 40 is the front surface, and the surface positioned on the opposite side of the front surface is the back surface.

The manipulating member hole 4006 is formed at the upper portion of the battery mounting case 29 around the opening 4002 in the direction in parallel with the depth direction.

The appliance side connecting terminals 42A and 42B are placed at the different position on the battery mounting recessed portion 40, which are formed at the places close to both ends in the width direction of the bottom wall 4004, and spaced in the width direction of the battery mounting recessed portion 40.

More specifically, as shown in FIG. 4, in the state in which the battery side connecting terminal 36A of the first battery 32A is faced to the appliance side connecting terminal 42A, the case is slid in the width direction of the battery mounting recessed portion 40 toward the appliance side connecting terminal 42A while the bottom surface 3402A of the case 34A of the first battery 32A is being pressed against the bottom wall 4004, whereby the appliance side connecting terminal 42A is connected to the battery side connecting terminal 36A of the first battery 32A.

In addition, as shown in FIG. 5, in the state in which the battery side connecting terminal 36B of the second battery 32B is faced to the appliance side connecting terminal 42B, the case is slid in the width direction of the battery mounting recessed portion 40 toward the appliance side connecting terminal 42B while the bottom surface 3402B of the case 34B of the second battery 32B is being pressed against the bottom wall 4004, whereby the appliance side connecting terminal 42B is connected to the battery side connecting terminal 36B of the second battery 32B.

The guide wall 44 is provided on the upper and lower wall surfaces positioned close to both ends in the height direction of the bottom wall 4004 in the battery mounting recessed portion 40.

The guide wall 44 prevents the first and second batteries 32A and 32B from moving in the height direction and in the depth direction of the battery mounting recessed portion 40 of the first and second batteries 32A and 32B, in the state in which the battery side connecting terminals 36A and 36B of the first and second batteries 32A and 32B are attached to the appliance side connecting terminals 42A and 42B.

In the embodiment, as shown in FIG. 4, the guide wall 44 is configured of first, second, and third guide walls 4402, 4404 and 4406 provided at three places in the width direction of the battery mounting recessed portion 40, and the first, second, and third guide walls 4402, 4404 and 4406 are provided at the places close to both ends in the height direction of the bottom wall 4004.

Thus, six guide walls 44 are provided in total.

As shown in FIG. 4, two first guide walls 4402 are engaged with two guide grooves 38A close to the battery side connecting terminal 36A among four guide grooves 38A of the first battery 32A, whereby the first battery 32A is prevented from moving in the height direction and in the depth direction of the battery mounting recessed portion 40.

As shown in FIG. 5, two second guide walls 4404 and two third guide walls 4406 are engaged with two guide grooves 38A close to the battery side connecting terminal 36B and two guide grooves 38B adjacent to these two guide grooves 38B, respectively, among six guide grooves 38B of the second battery 32B, whereby the second battery 32B is prevented from moving in the height direction and in the depth direction of the battery mounting recessed portion 40.

As shown in FIGS. 6, 11 and 12, two first engaging member holes 4010 are formed on the bottom wall 4004 at the end portion (upper portion) in the height direction of the battery mounting recessed portion 40, as spaced in the width direction.

As shown in FIGS. 7 to 10, on the back side of the bottom wall 4004 positioned on both sides of each of the first engaging member holes 4010, a guide wall 4012 is provided that guides the engaging members 46A and 46B, and in the surrounding area including areas provided with the first engaging member holes 4010 and the guide walls 4012, a boss portion 4014 is provided for mounting a metal plate 52.

As shown in FIGS. 6, 11 and 12, the engaging members 46A and 46B are provided so as to separately come in and go out of the battery mounting recessed portion 40 through the two first engaging member holes 4010.

As shown in FIGS. 8, 11 and 12, the two engaging members 46A and 46B have engaging portions 4602A and 4602B that come in and go out of the battery mounting recessed portion 40 through the first engaging member hole 4010 and have plate-shaped retaining portions 4602C and 4602D that are provided at the end portions of the engaging portions 4602A and 4602B.

As shown in FIG. 12, the engaging portions 4602A and 4602B are provided in such a way that they are movably guided in the depth direction of the battery mounting recessed portion 40 by the first engaging member hole 4010 and the guide wall 4012 and are not moved in the width direction of the battery mounting recessed portion 40.

The engaging member 46A of the two engaging members 46A and 46B is provided in such a way that the engaging member 46A is engaged with the battery 32A to prevent the battery 32A from moving in the direction in which the battery side connecting terminals 36A are detached from the appliance side connecting terminal 42A in the width direction of the battery mounting recessed portion 40, in the state in which the battery side connecting terminals 36A of the battery 32A in two types of the batteries 32A and 32B are attached to the appliance side connecting terminal 42A of the two appliance side connecting terminals 42A and 42B. In addition, the engaging member 46B is provided in such a way that the engaging member 46B is abutted against a bottom surface 3202A of the battery 32A and moved in the direction to retract outside the battery mounting recessed portion 40 against the urging force of the coil springs 54 (an energizing member), described later, in the state in which the battery side connecting terminals 36A of the battery 32A are attached to the appliance side connecting terminal 42A.

The engaging member 46B of the two engaging members 46A and 46B is provided in such a way that the engaging member 46B is engaged with the battery 32B to prevent the battery 32B from moving in the direction in which the battery side connecting terminals 36B are detached from the appliance side connecting terminal 42B in the width direction of the battery mounting recessed portion 40, in the state in which the battery side connecting terminals 36B of the battery 32B of two types of the batteries 32A and 32B are attached to the appliance side connecting terminal 42B of the two appliance side connecting terminals 42A and 42B. In addition, the engaging member 46A is provided in such a way that the engaging member 46A is abutted against a bottom surface 3202B of the battery 32B and moved in the direction to retract outside the battery mounting recessed portion 40 against the urging force of the coil springs 54 (the urging member), described later, in the state in which the battery side connecting terminals 36B of the battery 32B are attached to the appliance side connecting terminal 42B.

As shown in FIGS. 8 and 9, the manipulating member 50 has a manipulating portion 5002 that is movably provided on the manipulating member hole 4006 at the place on the battery mounting case 29 around the opening 4002 in the depth direction, and a retaining plate portion 5006 that is coupled to the end portion of the manipulating portion 5002, extended along the back side of the bottom wall 4004 and has two second engaging member holes 5004 formed thereon.

In the embodiment, the engaging portions 4602A and 4602B of the two engaging members 46A and 46B come in and go out of the battery mounting recessed portion 40 through the first engaging member hole 4010 and the second engaging member hole 5004, and the retaining portions 4602C and 4602D of the two engaging members 46A and 46B are retained at the retaining plate portion 5006 around the second engaging member hole 5004.

As shown in FIGS. 9 to 12, the coil springs 54 (the urging member) are provided between the metal plate 52 and the retaining plate portion 5006 for the two engaging members 46A and 46B, and separately urge the engaging members 46A and 46B in the direction to protrude inside the battery mounting recessed portion 40 in the depth direction.

In the embodiment, the manipulating portion 5002 has a thin plate shape. As shown in FIGS. 9 and 10, the manipulating portion 5002 is formed with a notch portion 5008 that is extended in the depth direction of the battery mounting recessed portion 40. The coil spring 48 is provided between one end of the manipulating portion 5002 and a wall portion provided on the battery mounting case 29 inside the notch portion 5008, and the coil spring 48 urges the manipulating member 50 in the direction from the back side of the bottom wall 4004 toward the front side.

Therefore, in the state in which the batteries 32A and 32B are not mounted inside the battery mounting recessed portion 40, the retaining portions 4602C and 4602D of the two engaging members 46A and 46B are retained on the retaining plate portion 5006 of the manipulating member 50 with the urging force of each of the coil springs 54, and the engaging portions 4602A and 4602B are protruded inside the battery mounting recessed portion 40. When the manipulating member 50 is pressed in this state, the two engaging members 46A and 46B are moved at the same time as they follow the manipulating member 50 in the depth direction through the retaining portions 4602C and 4602D and the retaining plate portion 5006.

Figure 15:
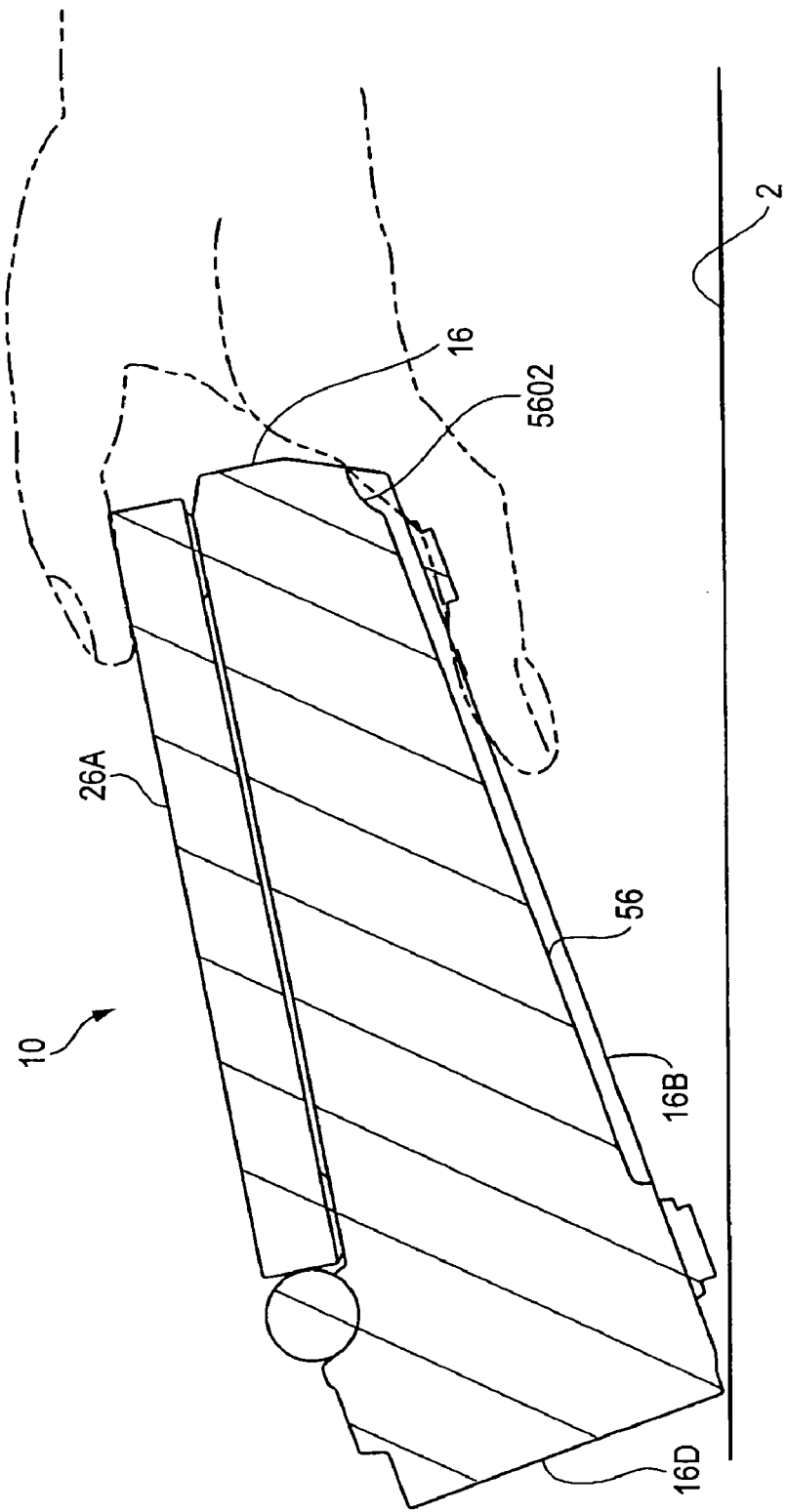
FIG. 15 shows an illustration depicting the electronic appliance 10 to be held.
Figure 16:
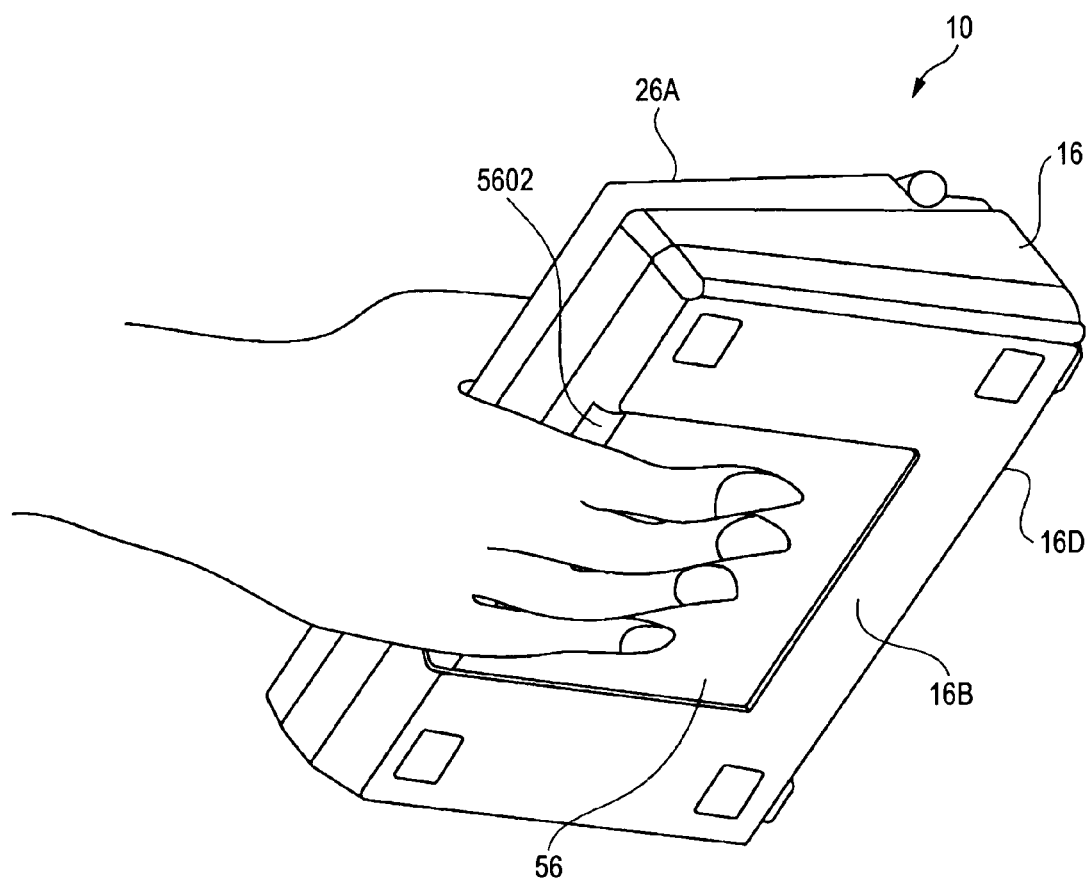
FIG. 16 shows a perspective view depicting the electronic appliance 10 being held.
Figure 17A:
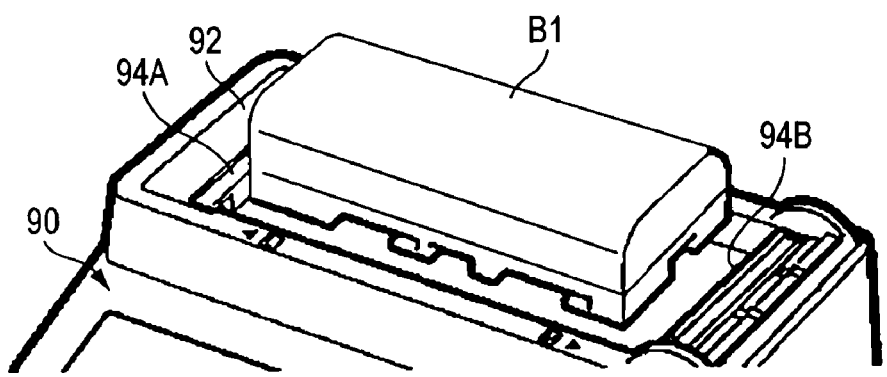
FIGS. 17A and 17B show an illustration depicting a battery mounting portion 92 of the electronic appliance before.
Figure 17B:
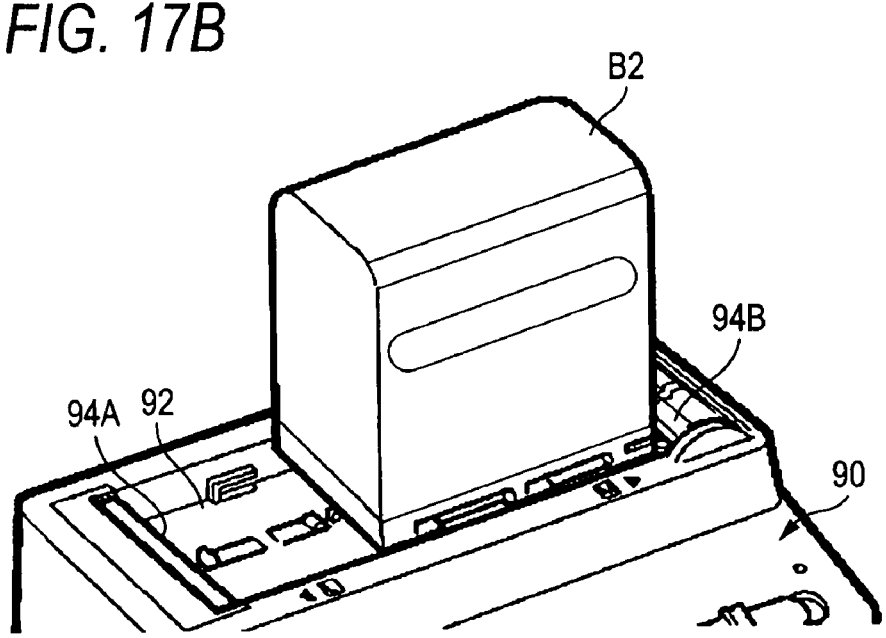

In addition, in the embodiment, as shown in FIGS. 14 to 16, on the bottom surface 16B of the cabinet 16, a recessed portion 56 on which fingers are put is provided from the front end of the bottom surface 16B to the place close to the rear surface 16D positioned opposite to the place at which the battery mounting case 29 is provided.

The recessed portion 56 is formed to have the depth, the width and the length in which four fingers are put thereon except a thumb at the center portion of the bottom surface in the width direction.

A front end 5602 of the recessed portion 56 is provided to have the depth in larger dimensions than the other places for easily putting fingers thereon.

The recessed portion 56 like this is provided to easily insert four fingers except the thumb into a clearance formed between a placement surface 2 and the recessed portion 56 in holding the electronic appliance 10 placed on the placement surface 2, and four fingers can be put on the bottom surface of the recessed portion 56 as well as the thumb can be put on the outer surface 26A of the panel case 26 to easily hold the electronic appliance 10, which advantageously allows the electronic appliance 10 to be easy handled.

Particularly in the case in which the recessed portion 56 like this is not provided, both hands are used to hold the right and left side surfaces of the cabinet 16 in holding the electronic appliance 10 because the clearance is scarcely created between the placement surface 2 and the bottom surface 16B of the cabinet 16, which causes inconvenient handling. On the other hand, the provision of the recessed portion 56 as in the embodiment allows the electronic appliance 10 to be held by one hand with the use of the recessed portion 56, which further advantageously allows the simple handling of the electronic appliance 10.

Next, the operation of mounting/dismounting the first and second batteries 32A and 32B from the battery mounting portion 30 will be described.

First, the case in which the first battery 32A is to be mounted on the battery mounting portion 30 will be described.

Figure 13A:
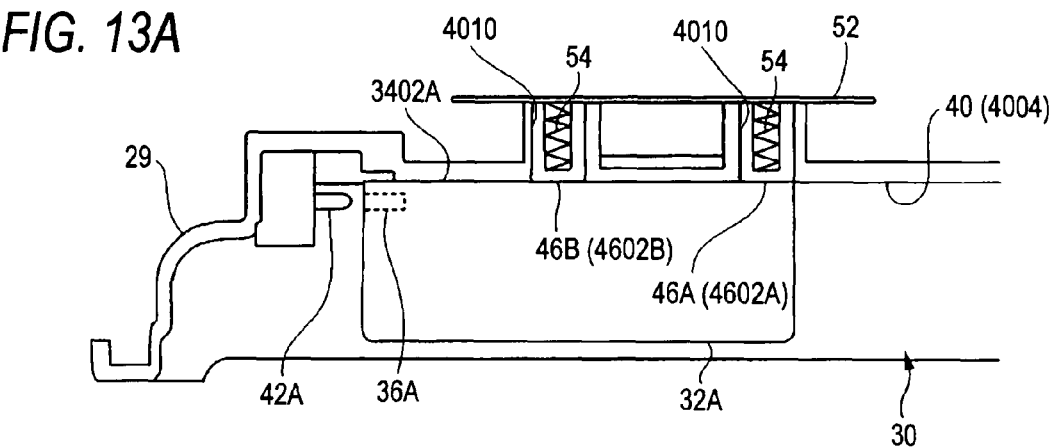
FIGS. 13A, 13B and 13C show an illustration depicting the mounting/dismounting operation of the battery.

As shown in FIG. 13A, the bottom surface 3402A of the first battery 32A is pressed against the bottom wall 4004 of the battery mounting recessed portion 40 while the battery side connecting terminals 36A of the first battery 32A are being faced to the appliance side connecting terminal 42A.

The engaging portions 4602A and 4602B are abutted and pressed against the bottom surface 3402A of the first battery 32A, whereby the two engaging members 46A and 46B are sunk from the battery mounting recessed portion 40 into the first engaging member holes 4010 against the urging force of the coil springs 54.

Then, in the state in which the battery side connecting terminals 36A of the first battery 32A are faced to the appliance side connecting terminal 42A, the bottom surface 3402A of the case 34A of the first battery 32A is slid toward the appliance side connecting terminal 42A while the bottom surface 3402A is pressed against the bottom wall 4004.

Thus, the two first guide walls 4402 are engaged with the two guide grooves 38A close to the battery side connecting terminals 36A among the four guide grooves 38A of the first battery 32A, the first battery 32A is moved to the appliance side connecting terminal 42A in the state in which the first battery 32A is not allowed to move in the height and depth directions of the battery mounting recessed portion 40 of the first battery 32A, and then the battery side connecting terminals 36A of the first battery 32A are attached to the appliance side connecting terminal 42A.

Figure 13B:
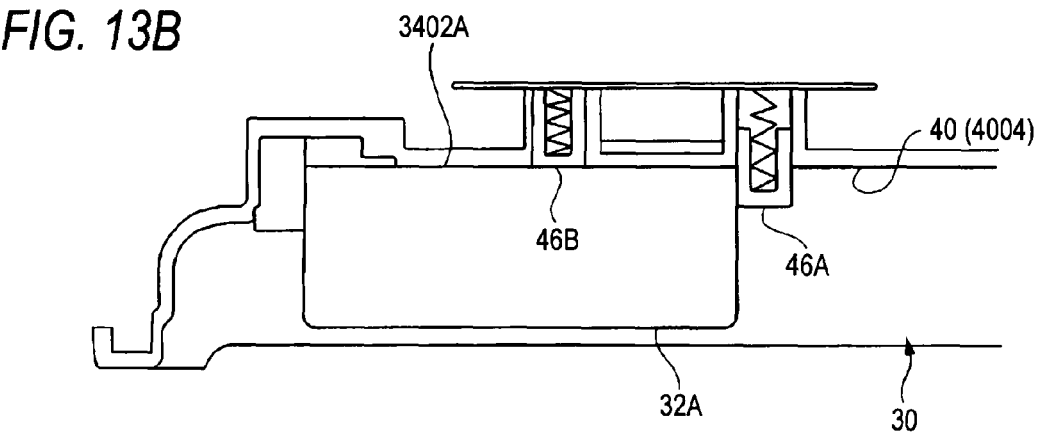

Then, as shown in FIG. 13B, in the state in which the battery side connecting terminals 36A of the first battery 32A are attached to the appliance side connecting terminal 42A, the engaging member 46A is protruded and engaged with the end surface positioned on the opposite side of the battery side connecting terminals 36A in both ends of the first battery 32A in the width direction.

Therefore, the first battery 32A is prevented from moving in the direction in which the first battery 32A is detached from the appliance side connecting terminal 42A in the width direction of the battery mounting recessed portion 40, in the state in which the first battery 32A is attached to the appliance side connecting terminal 42A, and the state of the mount of the first battery 32A on the battery mounting portion 30 is maintained.

At this time, the engaging portion 4602B is abutted against the bottom surface 3402A of the case 34A of the first battery 32A, whereby the engaging member 46B is sunk against the urging force of the coil springs 54 (it is moved in the direction to retract outside the battery mounting recessed portion 40). Thus, the bottom surface 3202A of the first battery 32A is pressed in the direction from the back side of the bottom wall 4004 toward the front side with respect to the first guide wall 4402 with the urging force of the coil springs 54, whereby the first battery 32A is prevented from wobbling in the height, width and depth directions of the battery mounting recessed portion 40.

Next, the case in which the first battery 32A is to be dismounted from the battery mounting portion 30 will be described.

In this case, the manipulating portion 5002 of the manipulating member 50 is pressed.

Figure 13C:
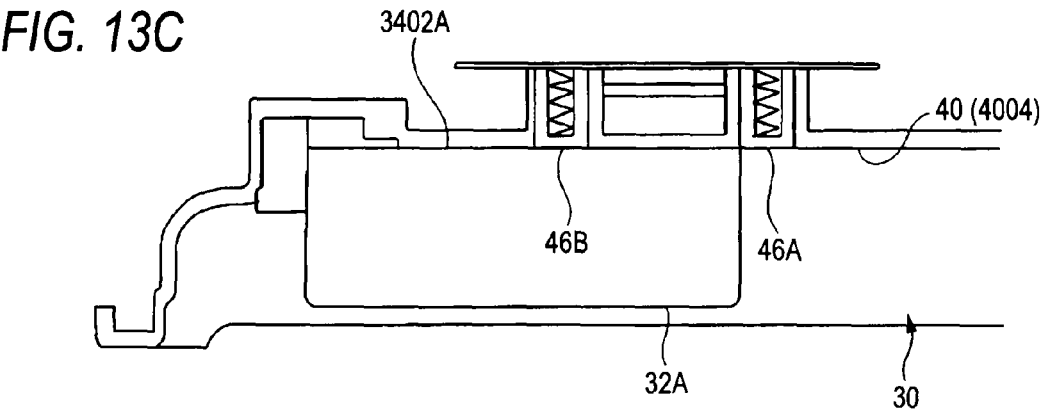

Then, as shown in FIG. 13C, the retaining plate portion 5006 is moved in the depth direction together with the manipulating portion 5002. Thus, the engaging portion 4602A of the engaging member 46A protruded inside the battery mounting recessed portion 40 is moved in the direction to separate from the back side of the bottom wall 4004 against the urging force of the coil springs 54 through the retaining plate portion 5006 and the retaining portion 4602C, the engaging portion 4602A is sunk from the battery mounting recessed portion 40 into the first engaging member hole 4010, and the engagement of the engaging member 46A with the first battery 32A is released.

In addition, the engaging member 46B that is abutted against the bottom surface 3202A of the battery 32A and displaced in the direction to retract outside the battery mounting recessed portion 40 against the urging force of the coil springs 54 is moved in the direction to further retract through the retaining plate portion 5006 and the retaining portion 4602D by the manipulation of the manipulating member 50. Thus, the press against the battery 32A with the urging force of the coil springs 54 is released.

In this state, the first battery 32A is held and slid in the direction to separate from the appliance side connecting terminal 42A in the width direction of the battery mounting recessed portion 40, whereby the engagement of the two first guide walls 4402 with the two guide grooves 38A as shown in FIG. 13A is released, as well as the battery side connecting terminals 36A of the first battery 32A are detached from the appliance side connecting terminal 42A.

Therefore, the first battery 32A can be moved in the height and depth directions of the battery mounting recessed portion 40, and then the first battery 32A is dismounted from the battery mounting portion 30.

Next, the case in which the second battery 32B is to be mounted on the battery mounting portion 30 will be described.

The bottom surface 3402B of the second battery 32B is abutted against the bottom wall 4004 of the battery mounting recessed portion 40 while the battery side connecting terminals 36B of the second battery 32B are being faced to the appliance side connecting terminal 42B.

The engaging portions 4602A and 4602B are abutted and pressed against the bottom surface 3402B of the second battery 32B, whereby the two engaging members 46A and 46B are sunk from the battery mounting recessed portion 40 into the first engaging member hole 4010 against the urging force of the coil springs 54.

Then, in the state in which the battery side connecting terminals 36B of the second battery 32B are faced to the appliance side connecting terminal 42B, the bottom surface 3402B is slid toward the appliance side connecting terminal 42B while the bottom surface 3402B of the case 34B of the second battery 32B is being pressed against the bottom wall 4004, and then the two second guide walls 4404 and the two third guide walls 4406 are engaged with the two guide grooves 38B closer to the battery side connecting terminal 36B among the six guide grooves 38B of the second battery 32B and the two guide grooves 38B adjacent to the two guide grooves 38B. Thus, the second battery 32B is moved to the appliance side connecting terminal 42B in the state in which the second battery 32B is not allowed to move in the height and depth directions of the battery mounting recessed portion 40, and then the battery side connecting terminals 36B of the second battery 32B are attached to the appliance side connecting terminal 42B.

Then, in the state in which the battery side connecting terminals 36B of the second battery 32B are attached to the appliance side connecting terminal 42B, the engaging member 46B is protruded and engaged with the end surface positioned on the opposite side of the battery side connecting terminals 36B in both ends of the second battery 32B in the width direction. In the state in which the second battery 32B is attached to the appliance side connecting terminal 42B, the second battery 32B is prevented from moving in the direction in which the second battery 32B is detached from the appliance side connecting terminal 42B in the width direction of the battery mounting recessed portion 40, whereby the state of the mount of the second battery 32B on the battery mounting portion 30 is maintained.

At this time, the engaging portion 4602A is sunk by the bottom surface 3202B of the second battery 32B against the urging force of the coil springs 54 (it is moved in the direction to retract outside the battery mounting recessed portion 40). Therefore, the engaging member 46A presses the bottom surface 3202B of the second battery 32B in the direction from the back side of the bottom wall 4004 toward the front side with respect to the second and third guide walls 4404 and 4406 with the urging force of the coil springs 54, whereby the second battery 32B is prevented from wobbling in the height, width and depth directions of the battery mounting recessed portion 40.

Next, the case in which the second battery 32B is to be dismounted from the battery mounting portion 30 will be described.

In this case, the manipulating member 50 is pressed in the depth direction of the manipulating member hole 4006.

Then, the retaining plate portion 5006 is moved in the depth direction together with the manipulating member 50. Thus, the engaging portion 4602B of the engaging member 46B protruded inside the battery mounting recessed portion 40 is moved in the direction from the front surface of the bottom wall 4004 toward the back surface against the urging force of the coil springs 54 through the retaining plate portion 5006 and the retaining portion 4602D, the engaging member 46B is sunk from the battery mounting recessed portion 40 into the first engaging member hole 4010, and then the engagement of the engaging member 46B with the second battery 32B is released.

In addition, the engaging member 46A that is abutted against the bottom surface 3202B of the battery 32B and displaced in the direction to retract outside the battery mounting recessed portion 40 against the urging force of the coil springs 54 is moved in the direction to further retract by the manipulating member 50 through the retaining plate portion 5006 and the retaining portion 4602C, and thus the press against the battery 32A with the urging force of the coil springs 54 is released.

In this state, the second battery 32B is held and slid in the direction to separate from the appliance side connecting terminal 42B in the width direction of the battery mounting recessed portion 40, whereby the engagement of the two second guide walls 4404 with the two third guide walls 4406 and the engagement of the two guide grooves 38A with the two guide grooves 38B are released, as well as the attachment of the battery side connecting terminal 36B of the second battery 329 to the appliance side connecting terminal 42B is released.

Therefore, the second battery 32B can be moved in the height and depth directions of the battery mounting recessed portion 40, and then the second battery 32B is dismounted from the battery mounting portion 30.

As discussed above, according to the embodiment, the two engaging members 46A and 46B are provided in such away that they can separately come in and go out of the battery mounting recessed portion 40 of the battery mounting portion 30, one engaging member of the two engaging members 46A and 46B is engaged with one battery of two types of the batteries 32A and 32B to prevent the battery from moving in the direction in which the battery side connecting terminal is detached from the appliance side connecting terminal, and the other engaging member of the two engaging members 46A and 46B is engaged with the other battery of two types of the batteries 32A and 32B to prevent the other battery from moving in the direction in which the battery side connecting terminal is detached from the appliance side connecting terminal.

Therefore, two types of the batteries 32A and 32B can be reliably mounted on the battery mounting portion 30, and it is intended to improve the stability in the state of the mount of the battery in carrying the electronic appliance 10, which advantageously reliably maintains the state of the connection of the battery side connecting terminal to the appliance side connecting terminal. In addition, the engagement of the engaging members 46A and 46B with the battery is just released to allow the battery to move in the direction in which the battery side connecting terminal is detached from the appliance side connecting terminal, which advantageously intends to improve the operability of dismounting the battery from the battery mounting portion 30.

In addition, since the engaging member that is not engaged with the battery in the two engaging members 46A and 46B presses the battery in the state in which the battery is mounted on the battery mounting portion 30, the wobbling of the battery mounted on the battery mounting portion 30 can be suppressed, which more advantageously intends to improve the stability in the state of the mount of the battery in carrying the electronic appliance 10.

Particularly, since the engaging member that is not engaged with the battery in the two engaging members 46A and 46B can suppress the wobbling of the battery without providing the member exclusive for suppressing the wobbling of the battery, which intends to reduce the number of components while it is intended to improve the stability in the state of the mount of the battery and also advantageously intends to downsize the electronic appliance 10 and to decrease costs.

Moreover, according to the embodiment, it is configured in which a single manipulating member 50 is manipulated to retract the two engaging members 46A and 46B from the inside of the battery mounting recessed portion 40 to the outside of the battery mounting recessed portion 40. Thus, in dismounting the battery from the battery mounting portion 30, only the single manipulating member 50 is manipulated regardless of the type of battery mounted, which advantageously intends to improve the operability.

In addition, in the embodiment, this case is described in which the first and second batteries 32A and 32B have the height and the depth of the cases 34A and 34B in the same dimensions but have the width in different dimensions, and the first and second batteries 32A and 32B have the different shape and different arranging positions of the battery side connecting terminals 36A and 36B.

However, the embodiment of the invention can be applicable to electronic appliances having a battery mounting portion on which two types of batteries having the different case shape and terminal shape is selectively mounted regardless whether the case dimensions of two types of batteries are the same, or the shape and arranging positions of the battery side connecting terminals of two types of batteries are the same.

In addition, in the embodiment, the case is described in which the electronic appliance 10 is a portable video tape recorder, but it is without saying that the embodiment of the invention can be widely applicable to various electronic appliances using two types of batteries.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic appliance comprising
 a battery mounting portion on which two types of batteries are selectively mounted,
 wherein the battery mounting portion has:
  a battery mounting recessed portion;
  an appliance side connecting terminal that is provided at different places in the battery mounting recessed portion and attached to or detached from a battery side connecting terminal of the battery;
  two engaging members that are provided at places different from the individual appliance side connecting terminals in the battery mounting recessed portion and separately come in and go out of the battery mounting recessed portion;

an urging member that individually urges the two engaging members in a direction to protrude into the battery mounting recessed portion; and
a single manipulating member that retracts the two engaging members from the inside of the battery mounting recessed portion to the outside of the battery mounting recessed portion,
in a state in which the battery side connecting terminal of one battery of two types of the batteries is attached to one of the two appliance side connecting terminals, one engaging member of the two engaging members is engaged with the one battery to prevent the one battery from moving in a direction in which the battery side connecting terminal is detached from the one appliance side connecting terminal, and
in a state in which the battery side connecting terminal of the other battery of two types of the batteries is attached to the other of the two appliance side connecting terminals, the other engaging member of the two engaging members is engaged with the other battery to prevent the other battery from moving in a direction in which the battery side connecting terminal is detached from the other appliance side connecting terminal.

2. The electronic appliance according to claim 1,
wherein in the state in which the battery side connecting terminal of one battery of two types of the batteries is attached to one of the two appliance side connecting terminals, the other engaging member of the two engaging members is abutted against the one battery, and moved in a direction to retract outside the battery mounting recessed portion against an urging force of the urging member, and
in the state in which the battery side connecting terminal of the other battery of two types of the batteries is attached to the other of the two appliance side connecting terminals, one engaging member of the two engaging members is abutted against the other battery, and moved in a direction to retract outside the battery mounting recessed portion against an urging force of the urging member.

3. The electronic appliance according to claim 1,
wherein the battery mounting recessed portion has a height, a depth and a width,
the appliance side connecting terminal is provided at places spaced in a width direction of the battery mounting recessed portion, and
the two engaging members are provided places spaced from the individual appliance side connecting terminals in the width direction in the battery mounting recessed portion.

4. The electronic appliance according to claim 1,
wherein the battery mounting recessed portion has a height, a depth and a width,
the appliance side connecting terminal is provided at places spaced in the width direction of the battery mounting recessed portion,
the two engaging members are provided places spaced from the individual appliance side connecting terminals in the width direction in the battery mounting recessed portion,
the appliance side connecting terminal is attached to or detached from the battery side connecting terminal by moving the battery in the width direction, and
the two engaging members are provided in such a way that they come in and go out of the battery mounting recessed portion in the depth direction of the battery mounting recessed portion in the battery mounting recessed portion and they are difficult to move in the width direction.

5. The electronic appliance according to claim 1,
wherein the battery mounting recessed portion has a height, a depth and a width,
the appliance side connecting terminal is attached to or detached from the battery side connecting terminal by moving the battery in the width direction, and
the battery mounting recessed portion further has a guide wall that prevents the battery from moving in a height direction and a depth direction of the battery mounting recessed portion in a state in which the battery side connecting terminal provided in the battery mounting recessed portion is attached to the appliance side connecting terminal.

6. The electronic appliance according to claim 1,
wherein the battery mounting recessed portion has a height, a depth and a width,
the two engaging members are provided in such a way that they can come in and go out of the battery mounting recessed portion in the depth direction of the battery mounting recessed portion in the battery mounting recessed portion,
a guide wall is provided that prevents the battery from moving in the depth direction of the battery mounting recessed portion in a state in which the battery side connecting terminal is attached to the appliance side connecting terminal in the battery mounting recessed portion,
the urging member urges the two engaging members in the depth direction and in a direction to protrude into the battery mounting recessed portion,
the other engaging member of the two engaging members is abutted against the one battery, and moved in the depth direction and in a direction to retract outside the battery mounting recessed portion against an urging force of the urging member in the state in which the battery side connecting terminal of one battery of two types of the batteries is attached to one of the two appliance side connecting terminals, and
one engaging member of the two engaging members is abutted against the other battery, and moved in the depth direction and in a direction to retract outside the battery mounting recessed portion against an urging force of the urging member in the state in which the battery side connecting terminal of the other battery of two types of the batteries is attached to the other of the two appliance side connecting terminals.

7. The electronic appliance according to claim 4,
wherein the battery mounting recessed portion has a bottom wall positioned at an end portion of the battery mounting recessed portion in the depth direction,
two first engaging member holes are formed on the bottom wall, and
the two engaging members come in and go out of the two first engaging member hole into the battery mounting recessed portion.

8. The electronic appliance according to claim 4,
wherein the battery mounting recessed portion has a bottom wall positioned at an end portion of the battery mounting recessed portion in the depth direction,
two first engaging member holes are formed on the bottom wall,
the two engaging members come in and go out of the two first engaging member hole into the battery mounting recessed portion, the bottom wall has a front surface facing the battery mounting recessed portion, and a back surface positioned opposite to the front surface, and an urging member that urges the two engaging members in a direction to protrude into the battery mounting recessed portion is provided on the back surface.

9. The electronic appliance according to claim 4, wherein the battery mounting recessed portion has a bottom wall positioned at an end portion of the battery mounting recessed portion in the depth direction, two first engaging member holes are formed on the bottom wall, the two engaging members come in and go out of the two first engaging member holes into the battery mounting recessed portion, the bottom wall has a front surface facing the battery mounting recessed portion, and a back surface positioned opposite to the front surface, and a guide that guides the two engaging members in the direction to come in and go out is provided on the back surface.

10. The electronic appliance according to claim 1, wherein the battery mounting recessed portion has a bottom wall positioned at an end portion thereof in a depth direction, the bottom wall has a front surface facing the battery mounting recessed portion, and a back surface positioned opposite to the front surface, and an urging member is provided that urges the manipulating member in a direction from the back surface toward the front surface.

11. The electronic appliance according to claim 1, wherein the battery mounting recessed portion is provided on a battery mounting case that is mounted on and dismounted from a cabinet of the electronic appliance, the battery mounting recessed portion has one end portion thereof in a depth direction formed into an opening for mounting and dismounting the battery, and the manipulating member is provided on the battery mounting case around the opening.

* * * * *